United States Patent

[11] 3,594,798

| [72] | Inventors | George F. Leydorf<br>Birmingham, Mich.;<br>Lucien W. Rawls, Leesburg, Va. |
|---|---|---|
| [21] | Appl. No. | 556,248 |
| [22] | Filed | Mar. 9, 1966 |
| [45] | Patented | July 20, 1971 |
| [73] | Assignee | Westinghouse Electric Corporation<br>Pittsburgh, Pa.<br>Continuation-in-part of application Ser. No.<br>77,587, Dec. 22, 1960. |

[54] UNDERGROUND ANTENNA
6 Claims, 9 Drawing Figs.

[52] U.S. Cl. .................................................... 343/719,
343/797, 343/873

[51] Int. Cl. .................................................... H01q 1/04
[50] Field of Search .......................................... 343/719

[56] References Cited
UNITED STATES PATENTS

| 1,424,365 | 8/1922 | Loftin et al. | 343/719 |
| 1,530,129 | 3/1925 | Loftin et al. | 343/719 |
| 2,992,325 | 7/1961 | Lehan | 343/719 X |

Primary Examiner—Rodney D. Bennett, Jr.
Assistant Examiner—Richard E. Berger
Attorneys—E. P. Klipfel and F. H. Henson ABSTRACT: The present invention relates in general to a hardened antenna, and in particular to a broadside array antenna which is placed at or below the surface of the ground, which is capable of withstanding the shock of explosions such as nuclear blasts.

PATENTED JUL 20 1971

INVENTORS
GEORGE F. LEYDORF
LUCIEN E. RAWLS

BY Nolte and Nolte

ATTORNEYS

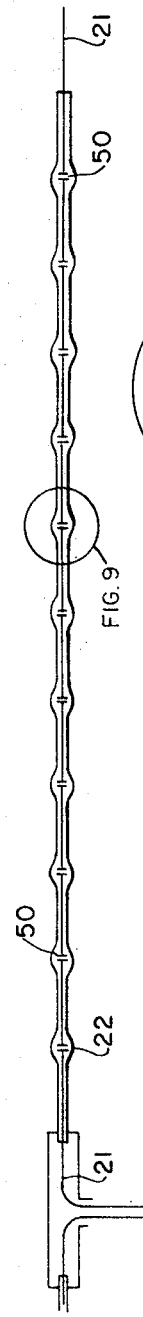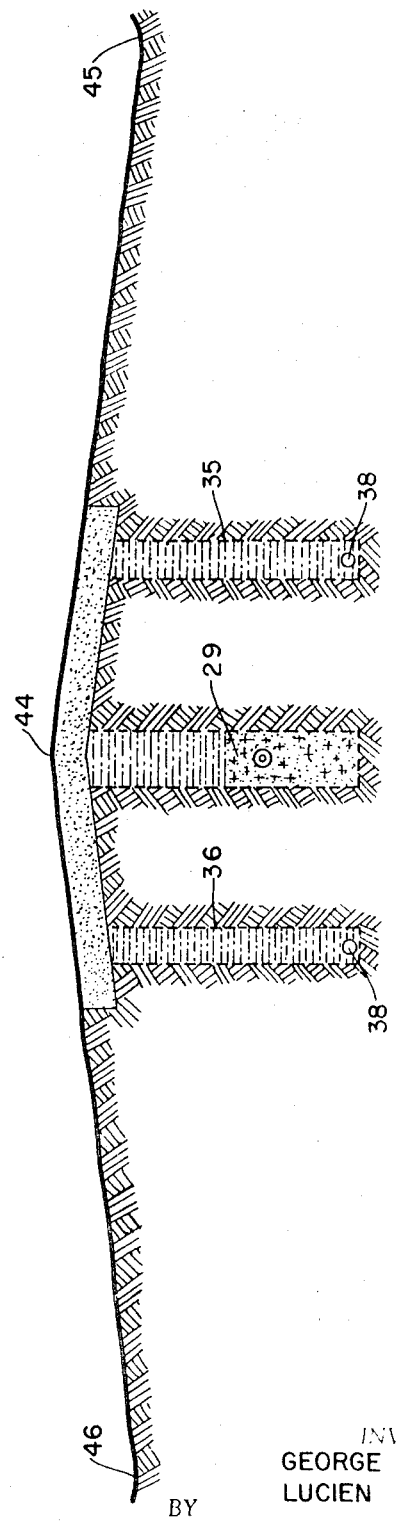

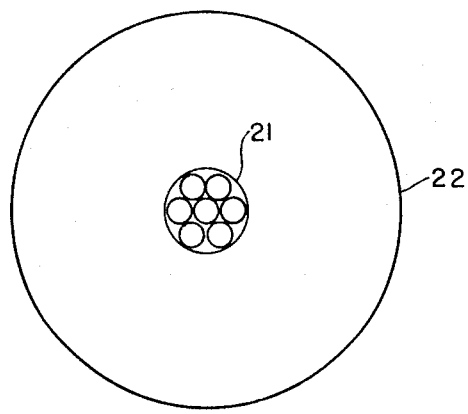
FIG. 6
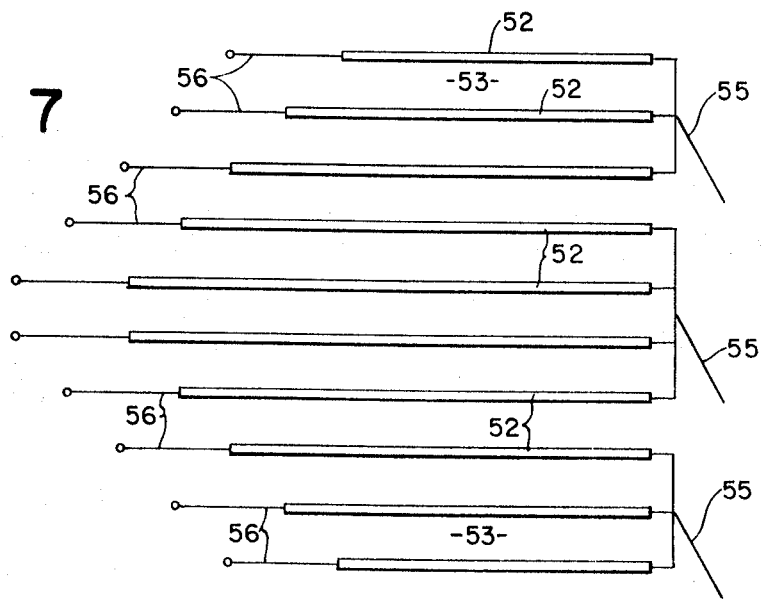
FIG. 7
FIG. 8
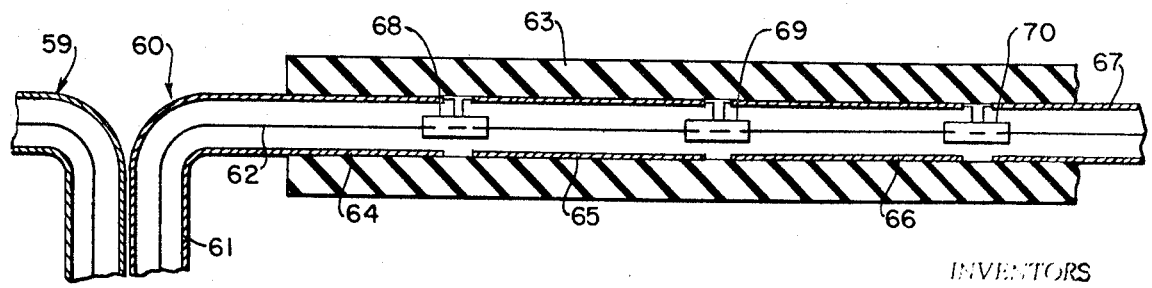

UNDERGROUND ANTENNA

This application is a continuation-in-part of application Ser. No. 77,587, filed on Dec. 22, 1960.

In the context of the present world situation, in which each year sees a proliferation of the number of nuclear weapons, and in which the nations of the world are approaching the problems facing them with increasing belligerency, it has become apparent that the need for a strong, adequate defense against nuclear weapons is increasingly more important. A critical part of such a defense system is a communications system by which the retaliatory weapons within the disposal of the defensive striking force can be quickly and efficiently brought into effect once a nuclear attack has been initiated against this country.

Therefore, the need for a communications system which can withstand the unparalleled destructive forces of a nuclear weapon becomes an essential part of the national defenses. The effects of the nuclear blast produce tremendous pressures and shock, and creates temperatures in the range of 2,000° C. near the center of the blast.

It has therefore been suggested to place communication systems including transmitting and receiving antennas, beneath the surface of the earth, which would be able to withstand the shock of a nuclear blast, and which will be readily operable moments after the blast occurs, to coordinate a retaliation strike by this country against an aggressive nation.

It is therefore an object of this invention to provide a novel antenna which is disposed at or beneath the surface of the earth and which, because of this novel construction, permits for efficient radiation of electromagnetic energy.

It is therefore another object of the present invention to provide such an underground, or hardened antenna, which will have the required ability to function after a nuclear blast and which also provides a high radiation efficiency relative to cost, which provides a broader band radiation pattern, which is relatively easy to construct and placed into position for operation, and which can produce radiation patterns which can be readily adjusted in both horizontal and radiation patterns.

It is also an object of the present invention to provide redundancy of antenna elements so that even if a portion of the antenna were destroyed by the blast, the antenna would still be able to operate at relatively high efficiencies.

It has been found that the high conductivity of the medium near or surrounding a buried antenna, or an antenna lying on or near the ground, creates an evironmental condition which is considerably different from that of the conventional above ground antenna elements. It is therefore necessary to develop new design considerations to provide for effective operation by buried underground antennas. In this respect, it has been noted that the attenuation of the ground to electromagnetic radiation is high compared with that of air, but that the mutual effect between antenna elements based relative to one another is considerably affected by the placement of these elements below the surface of the earth.

According to the present invention an antenna system is provided which consists of a series of electric dipole elements having a length of approximately a quarter of a wave length in air at the central operating frequency. The antenna is of the type which is referred to as a current sheet antenna, the basic portions of which are referred to as panels. The dipole elements or wires are spaced in a horizontal plane, parallel to each other at a depth of a few feet below the surface of the earth. This configuration is a broadside array in which each of the equally spaced radiating elements placed along the line carries currents of the same phase. An arrangement is known which has the ability of concentrating radiation in a plane perpendicular to the line of the array while producing relatively little radiation in other directions. The resulting radiation pattern approximates that of a short dipole in which the horizontal radiation pattern, which is vertically polarized, substantially is a "figure eight" pattern with the maximum field strength being radiated in the direction in line with the dipole elements having substantially a null in the direction normal to the axis of the elements, as the side lobes are substantially less in radiating power than the main lobes.

The launching efficiency of the current-sheet panel is largely a function of the launching efficiency of one element as established principally by the characteristics of the earth environment and of the number of parallel elements employed in the sheet, up to a limited number. A further factor increasing the efficiency of the antenna is the addition of a plurality of capacitors or impedance matching circuits placed in series with the dipole elements to keep the currents more or less uniform and prevent the buildup of large voltages thereon and consequent dielectric losses.

The invention will be fully understood from the following description and the accompanying drawings wherein:

FIG. 4 is a schematic partial view of a dipole element showing the series capacitors;

FIG. 5 is a cross section view on line 5–5 of FIG. 1 of the earth in the vicinity of a dipole element;

FIG. 6 is an end view of the wire of a dipole element;

FIG. 7 is a plan view of a modified dipole panel;

FIG. 8 is a schematic representation of a portion of a modified dipole element; and FIG. 9 is the enlarged view of the portion shown included in FIG. 4.

Figure 1:
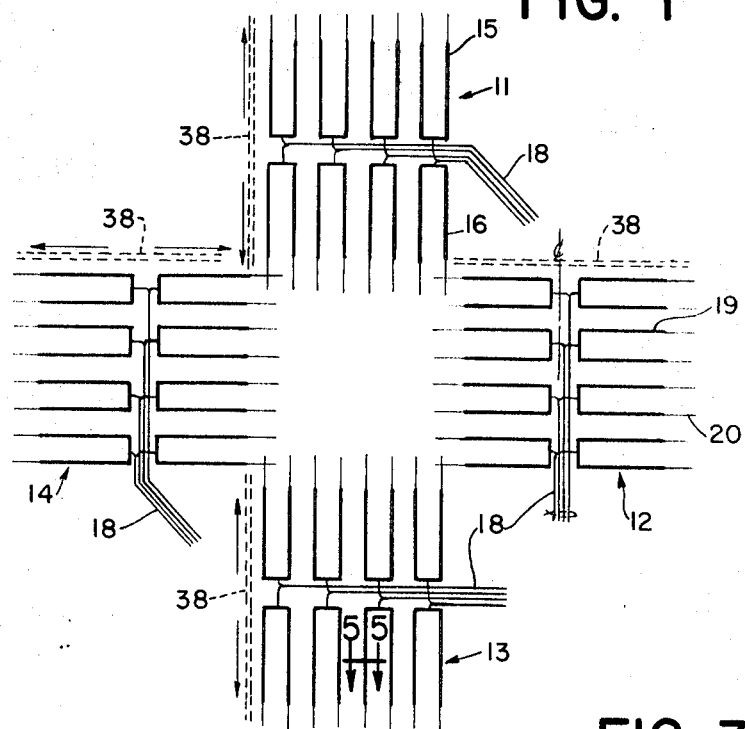
FIG. 1 is a plan view of an antenna according to the invention.

Referring to the drawings, there is shown an antenna which is located below the surface of the earth at a suitable depth such as 1—2 meters. The depth at which the antenna is buried will depend on the local soil conditions and other factors, such as the degree of hardness desired. The antenna consists of a plurality of dipoles 11, 12, 13 and 14 which are energized in phase quadrature and provide a pattern similar to that of a short vertical monopole above the ground plane. The reduced vertical radiation materially reduces the deleterious effects of sky wave selective fading at distances of 100 miles or thereabouts, depending on the frequency of operation and the conductivity of the terrain between the transmitter and receiver sites. Suitable operating frequencies are in the range of 5 kc. or less to 500 kc. or higher. For the sake of definiteness the invention will be described with reference to an antenna designed for 500 kc., which is an optimum frequency for long range radiation.

Each antenna panel is essentially a dipole consisting of a large number of parallel wires 15 and 16 connected to suitable feed cables 18. Cables 18 may consist, for example, of four two-wire cables, each two-wire cable being connected to opposite dipole elements as is well understood in the art. The cables are preferably twin-coax lines having an extra heavy metallic outer sheath for protection against breakage. Panels 11—14 are arranged in a quadrangular pattern as shown in FIG. 1, panels 11 and 13 being energized in phase quadrature with panels 12 and 14. The dipole elements or wires 15, 16 may consist of a core of preferably stranded wires surrounded by a large sheath of dielectric insulation. The insulation preferably has a low dielectric constant of say, 2 or less, and has a diameter of about 2 inches. Where the earth adjacent the wire has high dielectric losses it is preferable to make the diameter of the insulation as large as practical, but where the earth has low loss characteristics it is practical to make the diameter of the insulating sheath smaller. Portions 19 of the dipole elements 15 and 16 are covered with the insulating sheath 22 but the ends 20 of the dipole elements for a considerable distance, of about 20 meters, are left bare to provide grounding wires 20 for the dipole elements. Other and additional means for grounding the ends of the dipole elements can be used when required. Feed cables 18 for all panels are connected to the same radio receiving or transmitting apparatus.

Figure 2:
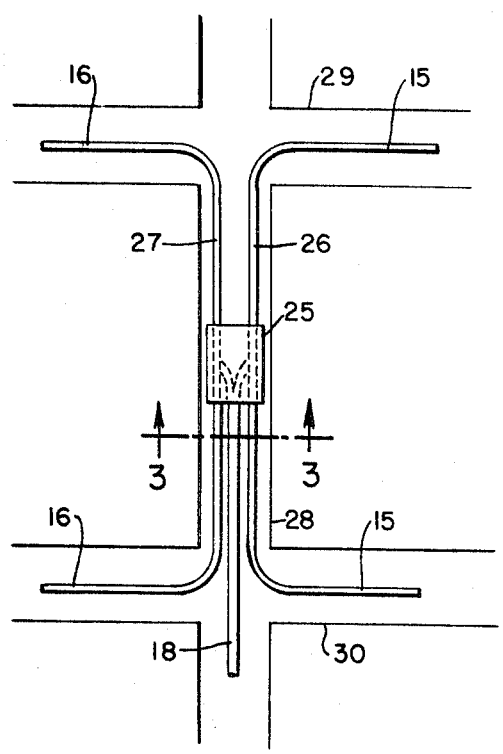
FIG. 2 is a detailed plan view showing the connections to a junction box.

Dipole elements 15 and 16 are connected to the feed cables 18 as shown in FIG. 2. Cable 18 enters a junction box 25 wherein it is connected to conductors 26 and 27 extending through a trench 28 and then into cross trenches 29 and 30 to conductors 15 and 16 of the dipole elements.

Figure 3:
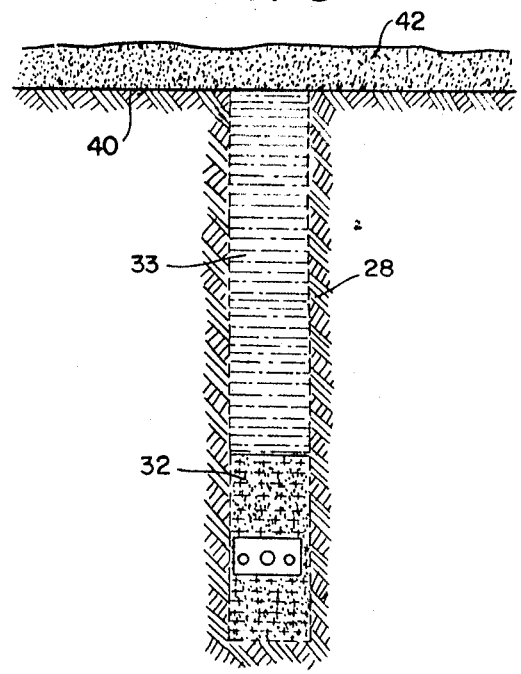
FIG. 3 is a partial sectional view along line 3–3 of FIG. 2 of the earth in the vicinity of a dipole element.

In order to reduce losses, trenches 28 to 30 are dug and then, after the cables and junction boxes and dipole elements are placed therein, are refilled with low dielectric loss materials such as treated coarse silicia sand or treated vermiculite 32, except at the ends 20 of wires 15 and 16, to a level slightly above the cables and dipole elements as indicated in FIG. 3. Above the layers 32 the trenches are then back filled with earth 33, to a level slightly below the earth's surface. Adjacent each trench 29 and 30 containing the dipole elements there is preferably dug another trench 35, 36 on either side of trenches 29 and 30 to provide water drainage. For this purpose drainage pipes 38 are placed in trenches 35 and 36 which drain from the center of each dipole towards the ends. Drainage pipes 38 are formed of a nonconducting material such as clay tile. Over an area extending beyond the trenches 29, 35 and 36, and along substantially the entire length thereof there is placed a suitable water proof film of plastic or other material to act as a roof over the trenches. Film 40 is then covered with stabilized and compacted soil 42. The film 40 and compacted soil 42 do not extend over the bare wire ends 20. To further facilitate water drainage, the surface of the earth is sloped as indicated in FIG. 5, so that there is a peak 44 over trench 29 and a slope down to a trough 45, 46, midway between two dipole wires 15 or 16. In typical ground having a conductivity of $10^{12}$ mhos per meter, a wire antenna $\lambda o/3$ long, buried 2 meters below the surface of the earth, and operating at a frequency of 500 kc., is found to have its launching loss reduced from approximately 32 db. to 22 db. $\lambda o$ being the wavelength in air.

A power loss in an underground antenna occurs in the end connection 20. This loss is reduced by insuring sufficient bare surface at the end of each of the insulated wires 15 and 16 to reduce its resistance much below the irreducible value of the ground return around the wire. Other losses that can be reduced in order to further increase efficiency are caused by radial E-field voltages across the capacitance of the wire. This loss is reduced by adding series capacitors 50 in the insulated portion of wires 15 and 16. Capacitors 50 are embedded in insulating sheath 22, as shown in FIGS. 4 and 9. The spacing and size of the capacitors are adjusted to minimize the loss, and, hence, maximize launching efficiency. The capacitors tune out the reactance of the wire. The resulting feed impedance at the center input terminals of wires 15 and 16 approximates a pure resistance equal that of the feed line 18.

The 500 kilocycle frequency selection lies within a broad range of useable frequencies covering several decades. The choice frequency, however, is governed by factors such as propagation of the waves and total system costs. Once a frequency is chosen, the size of each element of $\lambda o/3$ where $\lambda o$ is a wavelength in free space, becomes fixed and when a site for the antenna is chose, the frequency and the electrical parameters of the earth define the skin depth $\delta$. The skin depth is a function of resistivity and frequency and is a well known term in the art which can be calculated by well-known design equations once the frequency and resistivity are known.

As is the case in most engineering applications, the choice of spacing between elements is a trade between cost and performance. For wire spacing in excess of $2\delta$, the impedance of each pair of conductors is independent of the spacing. That is, mutual impedances are negligible for most practical purposes when the conductors are spaced more than two skin depths apart. In this range of spacing, the efficiency of a set of N pairs of conductors is N times the efficiency of single pair. If a pair of conductors is shorted or effectively removed, the impedances of the remaining terminals in the configuration remain the same and operation can be resumed at an efficiency decrease of N−1/N, once the transmission line connection to the shorter or defective pair is removed.

The relatively simple operational situations which is available with spacings greater than $2\delta$, coupled with the near optimum efficiency versus cost, produces an optimum design which produces a substantial reduction of mutual coupling between the array elements.

When the spacings are made less than $2\delta$, the resistance of individual pairs of antenna elements begins to rise in such a manner that relatively little gain in efficiency can be made, but improvement in band width is still realizable. Disabling a pair of elements will effect the impedance of the pairs on either side. In those cases where a gain in band width, slight gains in efficiency, and increased redundancy, outweigh the increases in cost and impedance instability, the designer would then use spacing of less than $2\delta$. Thus the spacing between adjacent pairs of conductors of $2\delta$ provides a substantial reduction of mutual coupling between the conductors, but in some circumstances a spacing of $\delta$ might well provide a sufficient reduction of mutual impedance and thus this might be regarded as substantial in some circumstances. Also, if extreme stability of feed point impedance is important, spacings of as high as $3\delta$ might be required. However, on the other hand, if a large tolerance on impedance stability were imposed, other design considerations might require a spacing of $\delta$ or even less and still provide sufficient reduction of mutual coupling.

In a broadside in-phase array, the directivity is dependent on the overall electrical distance between the outer conductors. When this distance is restricted to $\lambda o/3$, the directivity effect is small enough to be neglected. This is the basis for the $\lambda o/3$ limitation on overall dimensions. When the array of four current sheet elements is operating a null at the zenith is realized. The "figure of eight" pattern refers to the ground plane pattern of a single element, the maximum point of which carries the vertical plane through the zenith and back to the other side of the "figure eight" ground plane pattern. Actually the zenith is between 1 and 2 db. stronger for the single current sheet when the full $\lambda o/3$ overall dimension is used.

For a fuller understanding of the theoretical considerations between spacing of the array elements and mutual coupling between the underground element, the following mathematical analysis is presented.

Practical considerations now introduce the question as to the number of conductors actually needed. Although the field distribution in air will not be materially altered by relatively few conductors, the nonuniform distribution of currents in the earth may lead to greater losses and a lower overall field.

Consideration of losses leads again to the grounding arrangement. In some practical loss trades the loss in the grounds could lead to current distributions where the energy transmitted or radiated into the ground and into the air cannot readily be separated from that dissipated at or near the ground terminals. It is not theoretically necessary to make this separation, but the alternative is to be specific about all currents both in the grounding systems and in the parallel conductors running between them. A straight-forward and rather general procedure of this kind could be carried out, but would lead to an excessive amount of computation to obtain all the necessary impedances.

Since losses in the ground terminals affect both the air radiation and the earth radiation alike, the losses in the ground will be neglected. The ground system then is in effect a large plate at each end of the array perpendicular to the interconnecting conductors, (parallel to the $y-z$ plane).

To a good degree of approximation there will be one component of electric intensity, in the $x$-direction, that is, parallel to the wires. This electric intensity is produced by all the wires. For the vicinity of a given wire the greatest contribution comes from the wire itself, and the next largest contributions from the two wires on either side, and so on. When each of the wires carry a current I, all of the impedance relations follow, once the expression for E in terms of distance from a single wire is known. The relation between E and I in the case at hand is:

$$E = I \, \omega\mu \, Z^{(2)} \sigma(\gamma s)$$

where
$\omega = 2f$
$\mu = 4 \times 10^{17}$
$Z^{(2)}\sigma(\gamma s) =$ the Hankel function of the second kind of zero order.
$\gamma s =$ the independent variable of the Hankel function,
$\gamma =$ the propagation constant of the ground ($\gamma = \sqrt{j\omega\mu\sigma}$ and
$s =$ the perpendicular distance to the wire.
$\sigma =$ the conductivity of the earth This Hankel function will be found in tables such as those of Jahnke and Emde, or Abramowitz and Stegun.

When $s =$ radius of the conductor, $a$, carrying the current $I$, $E/I$ becomes the self impedance per unit length of the conductor, $z_{11}$. Since ($\gamma a$) is a small number, of the order of $10^{13}$ in the example to follow, a close approximation to the impedance is:

$$z_{11} = \frac{\omega\mu}{4}\left(\frac{1}{2} - j\frac{2}{\pi} \ln|\gamma a|\right) \Omega/\text{meter}$$

when $|\gamma a| = 10^{-3}$ this becomes $$z_{11} = \frac{\omega\mu}{4}\left(\frac{1}{2} + j4.4\right) \Omega/\text{meter}$$

if the frequency $10^5$ cycles per second; (100 kc):

$$z_{11} = 0.099 + j0.87 \text{ ohms/meter}.$$

In the table to follow, the mutual impedance per unit length versus spacing is tabulated in somewhat general terms. The real part is the resistance and has an influence on efficiency. The imaginary part (preceded by $j$) is the reactance and affects stored energy and bandwidth.

TABLE 1

Mutual Impedance vs Spacing

| ($\gamma s$) | $s/\delta$ | $4/\omega\mu$ (Mutual Impedance) ohm/m. |
|---|---|---|
| 0.02 | 0.01414 | 0.4997+j 2.564 |
| 0.05 | 0.0353 | 0.4984+j 1.981 |
| 0.1 | 0.0707 | 0.4946+j 1.541 |
| 0.2 | 0.1414 | 0.4826+j 1.103 |
| 0.5 | 0.353 | 0.4275+j 0.5449 |
| 0.7 | 0.495 | 0.3834+j 0.3574 |
| 1.0 | 0.707 | 0.3151+j 0.1825 |
| 1.2 | 0.847 | 0.2713+j 0.1075 |
| 1.4 | 0.99 | 0.2302+j 0.0786 |
| 1.6 | 1.13 | 0.1926+j 0.0162 |
| 1.8 | 1.27 | 0.1588−j 0.0094 |
| 2.0 | 1.414 | 0.1289−j 0.02652 |

$$\delta = \frac{\sqrt{2}}{\gamma} = \sqrt{\frac{2}{\omega\mu\sigma}} \text{ is the skin-depth}$$

The analysis to follow depends upon resistance and mutual resistance and even then on relative values. The significant contribution to resistance are added for a conductor 5 conductors or more in from the edge. Hence there are always two mutual impedances for each spacing, corresponding to the conductors on either side. Corrections for "edge effects" where this condition is not met, will not materially alter the results, and will therefore be omitted in the following.

The total resistance per unit length for the typical conductor is found for four separations:

$$s = \delta/2, \, s = \delta, \, s = 2\delta \text{ and } s = 4\delta$$

The distant field for a given power input falls of rapidly when $s$ exceeds $2\delta$.

If the frequency is 100 kc. and $\delta = 10^{12}$, $(\omega\mu\sigma)^{1/2} = 0.089$, $\sigma = 15.9$ m., $\lambda_0 = 3000$ m. $\lambda_0/4 = 750$ m., $w = \lambda_0/4 = 750$m.

The number of conductors for a spacing of $\delta$ is $N = w/\delta = 750/15.9 = 46.2 \approx 46$.

For $s = \delta/2$, $N = 92$, $\frac{4}{\omega\mu}R_{11} = 0.500$ $$|\gamma\delta| \frac{4}{\omega\mu}(2 \times R_m) \quad R_n = R_{11} + \sum R_m = 2.049$$

| 0.707 | 0.760 | |
| 1.414 | 0.458 | $P = N I_n^2 R$ |
| 2.121 | 0.226 | Solving for $N I_n$ which is proportional to the distant field |
| 2.83 | 0.087 | $N I_n = (NP/R)^{1/2}$ |
| 3.54 | 0.018 | |
| | 1.549 | |

$$92 I_{92} = \left(\frac{P \cdot 92}{2.05}\right)^{1/2} = 6.67 P^{1/2}$$

$s = \delta \quad N = 46 \quad R_n = R_{11} + \sum R_m = 1.052$ $|\gamma\delta| \quad \frac{4}{\omega\mu}(2 \times R_m)$ 1.414    0.456
2.83    0.087
4.23    0.0085
         .552

$$46 I_{46} = \left(\frac{P \cdot 46}{1.052}\right)^{1/2} = 6.61 P^{1/2}$$

$s = 2\delta \quad N = 23 \quad R_n = R_{11} + R_m = .597$ $\gamma s \quad \frac{4}{\omega\mu}(2 \times R_m)$ 2.82    0.087
5.65    0.01
         .097

$23 I_{23} = 6.18 P^{1/2}$ (.59 db down)

$s = 4\delta \quad N = 11.5$ $R_n = .51$ $11.5 I_{11.5} = 4.75 P^{1/2}$ (3 db down)

Note that these calculations are relative, such terms as $l$, $\frac{\omega\mu}{4}$, K, etc. have been dropped from all calculations.

From this example the advantages of the two skin depth spacing is apparent. The efficiency for this spacing is only 0.6 db. down from a spacing of $\delta/2$ involving four times as many conductors. The removal of one conductor, or the drive to one conductor, does not significantly change the impedance of the adjacent conductors. Depending on the problems posed, a somewhat greater or smaller spacing might prove more suitable when all factors are taken into account.

Not all wires of a panel need be the same length. As shown in FIG. 7, the wires 52 constituting the dipole elements of one side of a dipole have different lengths, being shorter at the outer sides of the panel than at the middle of the panel. The shape of the panel shown in FIG. 7 is illustrative of one of the forms the panel may take. Particularly, the insulated portions 53 of the dipole elements may vary in length in order to control the directivity and increase the efficiency of the dipole relative to its extent and cost. In FIG. 7, the dipole elements are formed essentially in the same manner as shown in FIGS. 1 and 4 and are connected to suitable feed cables 55 and have bare ends 56.

Another modification of the invention is shown in FIG. 8 illustrating portions of dipole elements 59 and 60 consisting of a coaxial cable having an outer conductor 61 and inner conductor 62, the input end of which extends to a transmitter. The dipole element 60 constitutes one of the wires 15, 16 of FIG. 1, or wire 52 of FIG. 7. Dipole element 60 is provided with an insulating sheath 63 over the radiating portion thereof. The radiating portion of the dipole consist of a number of sections 64, 65, 66, 67, which are separated from one another. Radiating elements 64 to 67 are connected to inner conductor 62 through impedance matching circuits 68—70, which may include a transformer and amplifier and an impedance matching pad. Essentially, impedance matching circuits 68—70 take the place of capacitors shown in FIG. 4 and serve to energize the radiating elements 64—67 while minimizing the voltage variations along the radiating elements. Thus, the impedance matching circuits reduce dielectric losses due to radial electrical fields produced by the dipole elements. At the right end 67 of the dipole element shown in FIG. 8, the outer conductor may extend for a considerable distance without insulation to form a bare end similar to the ends 20 in FIG. 1.

It will be understood that instead of using the entire array of FIG. 1 in some instances a single dipole may be used. The radiation from a single dipole of the type disclosed herein is in the direction of the dipole elements. The reason for this is that the waves radiated from the dipole elements toward the surface of the earth encounter a refraction of substantially 90° at the surface of the earth, so that the waves become vertically polarized and travel in a generally horizontal direction parallel to the direction of the wires and provide a "figure eight" pattern having nulls in the direction perpendicular to the dipole wires.

For the sake of definiteness the dimensions of an embodiment of the invention suitable for a frequency of 500 kc. are shown in the drawing.

It will be understood, however, that the embodiments herein disclosed are exemplary and that it will be evident to those skilled in the art that many variations may be made without departing from the principles of the invention embodied in the structures defined in the following claims.

What We claim is:

1. An underground high redundancy antenna system comprising a plurality of dipole antennas, each dipole antenna comprising feed line means and a plurality of parallel wires forming each side of each dipole antenna, said wires extending in opposite direction from said feed line means and connected to said feed line means in parallel, the wires of each of said sides being spaced apart a sufficient distance at a sufficient depth to enable the earth to substantially reduce the mutual coupling between the wires, each of said antennas being insulated over a major portion thereof, and conductive means in contact with the earth connected to the ends of said wires to reduce the power loss, said dipole antennas being spaced from each other in the direction in which said wires extend.

2. An antenna system according to claim 1 including a second plurality of dipole antennas constructed similarly to said first plurality of dipole antennas, said second dipole antennas having their wires extending substantially at right angles to the wires of the first plurality of dipole antennas and feed line means connected to said second dipole antennas.

3. For use in the transmission of radio frequencies, an underground antenna comprising at least one dipole antenna, each side of said dipole antenna including a plurality of substantially parallel wires to thereby increase the launching efficiency of said antenna, said parallel wires being spaced apart a sufficient distance at a specified depth within the earth to enable the earth to substantially reduce the mutual coupling between the wires, said wires being insulated over at least a portion of their length, the thickness of said insulation being related to the loss characteristics of the adjacent earth.

4. An underground antenna according to claim 3, wherein a sufficient length of the end of each of said wires is in a conductive relationship with the earth to reduce the power loss in the antenna.

5. An underground array antenna comprising a plurality of spaced pairs of colinear conductors lying beneath and in close proximity to the surface of the earth, each of said conductors having a coating of insulation over a portion thereof, the other portion of each of said conductors being in direct contact with the earth, each of said pair of conductors being of a length not greater that one-third of a wavelength in free space of the energy radiated thereby, the spacing between each of said pairs of conductors being substantially equal to $2\delta$, $\delta$ being the skin depth of the earth, for substantially reducing the mutual coupling between adjacent pairs of conductors.

6. The antenna of claim 5 wherein said plurality is chosen to be of such a number that the overall distance between the outermost conductors is substantially equal to one-third of the wavelength in free space of the energy radiated thereby.